July 26, 1960 R. C. MOTT 2,946,344
PRESSURE REGULATING VALVE
Filed April 10, 1958
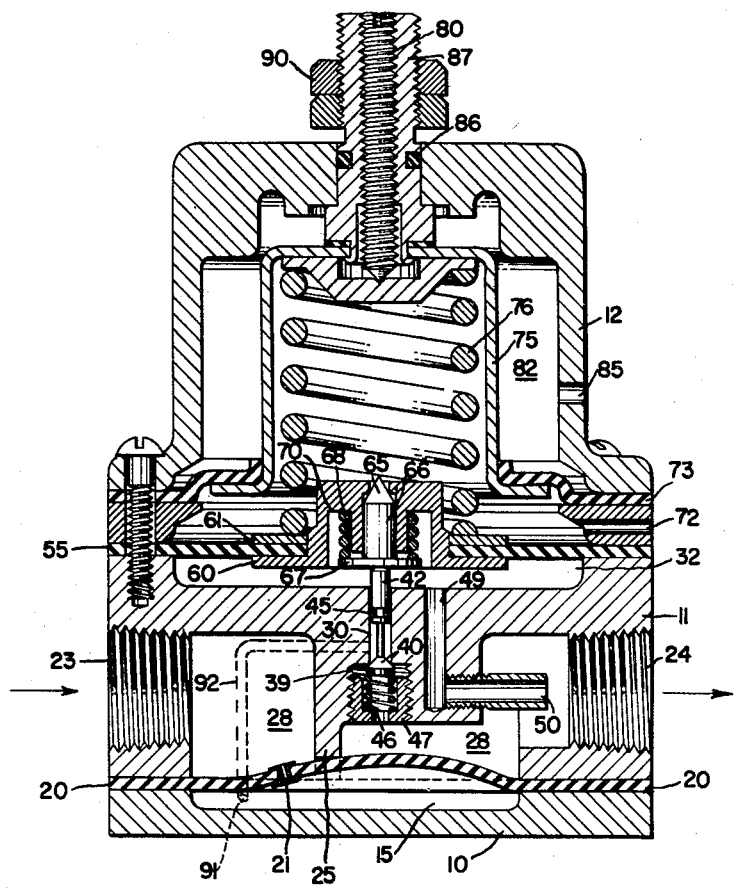
INVENTOR.
RICHARD C. MOTT
BY Joseph E Ryan
ATTORNEY

United States Patent Office 2,946,344
Patented July 26, 1960

2,946,344

PRESSURE REGULATING VALVE

Richard C. Mott, Harwood Heights, Ill., assignor to Minneapolis-Honeywell Regulator Company, Minneapolis, Minn., a corporation of Delaware Filed Apr. 10, 1958, Ser. No. 727,716

2 Claims. (Cl. 137—484.8)

My invention relates to pressure regulating valves and more particularly to an improved low drop pressure regulating valve.

Apparatus of this general type are well known and the present invention is directed to an improved regulating valve regulator using a self contained valve which permits low drop characteristics to be piloted by a simple pilot valve and controlled from an indication of a rate of flow in the outlet of the regulator. Therefore, it is an objective to provide an improved low drop pressure regulating valve. Another object is to provide in a pressure regulating valve, a self contained bladder type operator which is simple to manufacture and maintain. A further object of this invention is to provide in a pressure regulating valve of this type an arrangement in which pilot control pressure is obtained from an aspirator tube in the outlet to offset drop caused by increased flow through the regulator. These and other objects of this invention will become apparent from a reading of the attached description together with the drawing which shows a schematic drawing of the regulator.

As shown in the drawing, the casing for the regulator is comprised with a number of parts including a lower section 10 and an intermediate section 11 and an upper section 12. Lower part 10 has recess 15 therein over which is positioned a slack diaphragm indicated at 20 having a small bleed port 21 therein. The intermediate section 11 of the casing includes an inlet port 23 and an outlet port 24 with a weir 25 intermediate to the same and a passage 28 intermediate to ports 23 to 24 which is adapted to be separated by the weir or valve seat when the diaphragm is urged against the same. Also included in the casing portion 11 is a centrally located passage indicated at 30 extending to the passageway 28 to a recess 32 by the upper surface of the portion of the casing 11. The aperture passage 30 has a large recess 39 at the extremity adjacent to 28 in which is positioned a valve plug 40, having connected thereto an operating shaft 42 of reduced dimension extending into the chamber 32. The shaft 42 includes a small opening with the O-ring 45 on the land portion thereof for sealing the upper portion of the shaft and the valve plug is biased into position to seal the aperture 30 by means of a spring 46 held in a position by a tapped nut or plug 47 threaded into the recess 39. Also included in the intermediate casing 11 is a passage 49 extending between the recess 32 and the outlet 24 and including an aspirator tube 50 positioned in the outlet for purposes to be later identified.

Positioned above the recess 32 is a second diaphragm indicated at 55 which defines with the recess 32 a pilot chamber indicating with the conduit 49 and aspirator tube 50 which have been pressed therein in proportion to flow of outlet 24. The diaphragm 55 has an opening therein which is positioned to a spring support member backing plate 61 on the opposite side of the diaphragm, the two parts being secured to the diaphragm to suitable means not shown. The support 60 has an aperture therethrough indicated at 65 in which is positioned a valve plug 66 having a flange section 67 with a spring means 68 positioned between the flange section and the support 60 in a recess 70 thereof to urge the valve plug 66 out of engagement with the passage 65.

Above the diaphragm 55 is positioned a space member having an aperture therethrough to be later identified, which forms a part of the casing and has mounted above the same a third diaphragm 73 over which is positioned a casing part 12 with the casing parts 11, 12 and 10 as well as the space member 62 and diaphragm 73 secured together to suitable means to maintain a seal between the parts. The diaphragm 73 mounts a spring housing 75 which incloses a regulating spring 76 of the regulator which rests at one extremity of the under surface housing 75 and at the opposite extremity is the backing plate 61 of the spring support to urge the diaphragm toward the recess. Spring support 75 cooperates with an adjusting screw 80 extending through the casing part 12 to adjust the bias setting of the spring for conventional adjustment purposes. The area above the diaphragm 73 and spring support 75 and within the casing part 12 provides the chamber 82 which shall be identified as a said remote set-point chamber into which may be inserted air pressure for setting purposes through an aperture 85 positioned in the casing part 12. The adjusting screw 80 is positioned in a threaded guide 86 having a shoulder 87 thereon with a guide to 86 being sealed to the wall of the casing part 12 through a suitable O-ring indicated at 88. Adjustment of the screw 80 within the casing part 86 applies the pressure to the spring case 75 urging the same downward of the shoulder 87 of the casing applying or forcing it to the casing part 12. Suitable nut means indicated in 90 are positioned on the extremity of the casing part 86 for low limit purposes and also to retain the casing part 86 within the casing part 12. In addition to the above, the recess 15 which is the working chamber of the diaphragm 20 has included therein a port 91 which extends through a conduit 92, shown in phantom, to the passage 30 above the valve plug 40 to provide an escape path or relief path for the pressure within the working chamber of the regulator.

In operation, inlet air is fed through inlet 23 to the regulator where the air pressure entering the working chamber 15 of the regulator through the passage or restriction 21 in the diaphragm 20. This air pressure because of the large surface area of the diaphragm exposed to the passageway 28 then a portion of the passage adjacent the inlet 23 on the upper side of the regulator will cause the diaphragm to be urged against the weir 25 closing off the air passage 28 between the inlet 23 and outlet 24. Control of the pressure of the working chamber 15 is provided with the valve formed of the plug 40 and the recess 39 from the aperture 30 in the casing part 11. Inasmuch as the conduit 92 from the working chamber is connected above the valve plug and until the valve plug is moved down permitting the air to escape through the conduit 92 from the working chamber beyond the valve plug and through the recess 39 to the outlet 24, the pressure will be maintained within the working chamber, urging the diaphragm against the weir. Thus, a self contained main valve of the bladder type is provided with the regulator which will provide the minimum amount of drop through the valve and permit a low drop type regulator. Whenever the valve plug 40 is moved by virtue of the valve stem 42 being moved down against the action of the spring 46, a passage will be opened from the working chamber to the outlet side permitting the bleed of the air into the chamber 15 and a release of the diaphragm against the weir and hence air flow through the passage 28 connecting the inlet and outlet. Air flow through the outlet 24 will create a pressure at the aspirator tube 50 communicating with the passage 29 to the pilot chamber 32 which will urge the diaphragm 55 against the action against the spring 76 and the support 75 which is held in position by means of the screw 80 and casing part 86. Adjustment of the spring into position 76 will determine the setting pressure of the regulator biasing the diaphragm 55 against the pressure in the chamber 49. With the deflection of the diaphragm there is a reduction in pressure in the pilot chamber below the set point adjustment of the regulator, the spring support 60 will move down urging the flange 67 of the valve plug 66 down against the stem or support 42 of the valve plug 40 opening the valve plug 40 away from the shoulder of recess 39 then opening the passage 92 from the working chamber 15 to relieve the pressure therein and open the bladder type valve for the regulator, with increase in flow through the regulator will create pressure in the aspirator tube 50 which will change the pressure in the pilot diaphragm 49 urging the diaphragm upward. In the event that the pressure in the pilot diaphragm increases beyond the set point adjustment of the spring 76, the diaphragm will be urged upward away from the end of the valve stem 42 allowing the valve plug 66 to be urged away from the aperture or seat 65 through the operation of spring 68 to vent the pilot chamber to the area under the diaphragm 73 and spring support 75. As indicated previously the spacer member 72 has an aperture therein venting this chamber to the atmosphere for relief of the pilot pressure which will return the diaphragm to its normal position. Thus, the bladder type main valve will be controlled by the position of the pilot valve controlling the bleed of pressure from the working chamber 15 or the closure of this bleed passage to operate the same to control the air flow through the regulator. The pilot chamber includes the valve formed by passage 65 and plug 66 controlling a venting chamber or conduit for the pilot chamber 49 to reduce the flow through the regulator should it exceed the normal setting.

The chamber of the spring support 75 and diaphragm 73 defines an auxiliary working chamber designed for remote setting adjustment of the regulator. Through the seal on the adjusting screw 80 and the diaphragm 73 with the casing part 12, an air tight chamber is provided having an entrance support 85 through which remote pressure may be applied to the upper portion of the regulator adjusting the spring support down and hence the end of the spring down to the same spring adjusting screw 80 effects spring adjustment and hence brings another setting. Thus the passage 80 would normally be connected through a pressure line to a remote point where an auxiliary pressure could be provided for remotely adjusting the regulator setting in a conventional manner.

In considering this disclosure, it should be remembered that the above details are intended to be illustrative and I wish to be limited only by my appended claims.

I claim:
1. A pressure regulator comprising, a casing having inlet and outlet means, a weir integral with said casing and positioned intermediate said inlet and outlet means, a slack diaphragm positioned within said casing and engaging with said weir to separate said inlet and outlet means and provide a chamber remote from said inlet and outlet means, aperture means in said diaphragm on said inlet side and communicating with said chamber such that inlet pressure may fill said chamber and urge said diaphragm towards said weir, conduit means connected at one extremity to said chamber and at the other extremity to said outlet means, a recess in said casing and a second diaphragm positioned across said recess and defining a pilot chamber therein, a spring included in said recess on the opposite side of said diaphragm from said pilot chamber and urging said diaphragm towards said pilot chamber, pilot valve means positioned in said casing and included in said conduit to said outlet means in said casing to control the inlet pressure in said first named chamber to control the position of said first named diaphragm, an aspirator tube in said casing and extending into said outlet means being connected to said pilot chamber to provide a pressure therein proportional to the flow pressure at said outlet tmeans, additional pilot valve means included in said second named diaphragm and connecting said pilot chamber to the portion of said recess in said casing in which said spring is positioned to vent said pilot chamber, and setting means positioning the extremity of said spring remote from said diaphragm to adjust the bias of the same on said diaphragm, said pilot valve means being operated by variation in pressure in said pilot chamber causing movement of said diaphragm against said spring to operate said pilot valve means to open said conduit to said outlet means for decreasing pressures in said pilot chamber below a predetermined value and to open said pilot chamber to said portion of said recess above said pilot diaphragm for increasing pressures above a predetermined value which predetermined value is controlled by the adjustment of said setting means positioning the extremity of said spring.

2. A pressure regulator comprising a casing having inlet and outlet ports, a weir integral with said casing and positioned intermediate said inlet and outlet ports, a slack diaphragm positioned within said casing and engaging said weir to separate said inlet and outlet ports through said casing and provide a chamber remote from said inlet and outlet ports, aperture means in said diaphragm adjacent said inlet port and communicating with said chamber such that inlet pressure may fill said chamber and urge said diaphragm against said weir, conduit means connected at one extremity to said chamber and at the other extremity to said outlet port, a recess in said casing and a second diaphragm positioned across said recess and defining a pilot chamber therein, a spring included in said recess on the opposite side of said diaphragm from said pilot chamber and urging said diaphragm towards said pilot chamber, pilot valve means positioned in said casing and included in said conduit to said outlet means in said casing to control the inlet pressure in said first named chamber to control the position of said first named diaphragm, an aspirator tube in said casing and extending into said outlet means being connected to said pilot chamber to provide a pressure therein proportional to the flow pressure at said outlet means, additional pilot valve means included in said second named diaphragm and connecting said pilot chamber to the portion of said recess in said casing in which said spring is positioned to vent said pilot chamber, said pilot valve means being operated by variation in pressure in said pilot chamber causing movement of said diaphragm against said spring to operate selectively said first named and said additional pilot valve means to open said conduit to said outlet means for decreasing pressures in said pilot chamber below a predetermined value and to open said pilot chamber to said portion of said recess above said pilot diaphragm for increasing pressures above a predetermined value, means for adjusting said predetermined value including a third diaphragm positioned in said recess in said casing and operatively connected to the end of said spring defining a setting chamber, and conduit means in said casing providing a passage for a remote pressure source to said setting chamber to provide for remote adjustment of said regulator.

References Cited in the file of this patent
UNITED STATES PATENTS

| 1,580,481 | Gavin | Apr. 13, 1926 |
| 2,265,210 | Waddell | Dec. 9, 1941 |
| 2,707,966 | Taplin | May 10, 1955 |
| 2,806,481 | Faust | Sept. 17, 1957 |

FOREIGN PATENTS

| 534,013 | Germany | Sept. 21, 1931 |
| 847,444 | France | July 3, 1939 |
| 505,411 | Italy | Dec. 17, 1954 |